(12) United States Patent
Czarnota et al.

(10) Patent No.: US 10,438,339 B1
(45) Date of Patent: Oct. 8, 2019

(54) OPTICAL VERIFICATION SYSTEM AND METHODS OF VERIFYING MICRO DEVICE TRANSFER

(71) Applicant: Apple Inc., Cupertino, CA (US)

(72) Inventors: Patrick J. Czarnota, Milpitas, CA (US); Paul Argus Parks, Los Altos, CA (US); Nile A. Light, Livermore, CA (US); Stephen P. Bathurst, Lafayette, CA (US); John H. Higginson, Santa Clara, CA (US); Stephen R. Deming, Mountain View, CA (US); Robert B. Martin, Sunnyvale, CA (US); Tsan Y. Chan, Santa Clara, CA (US); Andreas Bibl, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 59 days.

(21) Appl. No.: 15/695,953

(22) Filed: Sep. 5, 2017

Related U.S. Application Data

(60) Provisional application No. 62/393,441, filed on Sep. 12, 2016.

(51) Int. Cl.
*G06K 9/00* (2006.01)
*G06T 7/00* (2017.01)

(52) U.S. Cl.
CPC .. *G06T 7/0008* (2013.01); *G06T 2207/30148* (2013.01)

(58) Field of Classification Search
CPC ..... G06T 7/0008; G06T 7/001; G06T 7/0002; G06T 7/0004; G06T 7/97; G06T 1/20; G06T 2207/30148; G06T 2207/30141; G06T 2207/30144; G06T 2207/30168; G06T 2207/10016; G06T 2207/10024; G06T 2207/10056; H01L 51/56; H01L 21/67253; H01L 21/681; H01L 22/12; H01L 22/34; H01L 24/03; H01L 2224/75753; H01L 2224/76753; H01L 2224/78753; H01L 2224/79753; H01L 2224/80121; H01L 2224/81101; H01L 2224/82101; H01L 2224/83101; H01L 2224/759; G06K 9/4609; G06K 9/6202; Y10S 414/135; Y10T 29/49778; Y10T 29/53313; B81C 99/002; B41M 5/265; H04N 1/2112; H04N 13/254; H04N 2013/0081; H05K 13/08; H05K 13/0015; H05K 13/0069; H05K 13/0812; H05K 13/0818; H05K 13/0452; G03F 7/70633;
(Continued)

(56) References Cited

U.S. PATENT DOCUMENTS

| | | | |
|---|---|---|---|
| 4,618,938 A * | 10/1986 | Sandland | G06T 7/001 348/126 |
| 7,012,684 B1 * | 3/2006 | Hunter | G01N 21/8903 250/559.44 |
| 7,545,514 B2 | 6/2009 | Manickam et al. | |

(Continued)

*Primary Examiner* — Jose L Couso
(74) *Attorney, Agent, or Firm* — Jaffery Watson Mendonsa & Hamilton LLP

(57) ABSTRACT

An optical verification method and mass transfer system described. In an embodiments, a mass transfer sequence may be accompanied by optical imaging and inspection to detect pick and place errors. The optical imaging and inspection techniques may be performed in-situ.

21 Claims, 11 Drawing Sheets

(58) Field of Classification Search
CPC ........... G01N 21/8806; G01N 21/9501; G01N 21/9503; G01N 21/956
See application file for complete search history.

(56) References Cited

U.S. PATENT DOCUMENTS

| | | | |
|---|---|---|---|
| 9,252,375 B2 | 2/2016 | Bibl et al. | |
| 10,183,401 B2* | 1/2019 | Higginson | B81C 99/002 |
| 2002/0133940 A1 | 9/2002 | Kadomatus et al. | |
| 2003/0076989 A1* | 4/2003 | Maayah | G06T 7/0004 |
| | | | 382/145 |
| 2003/0110610 A1* | 6/2003 | Duquette | H04N 13/254 |
| | | | 29/407.09 |
| 2004/0048173 A1* | 3/2004 | Tutt | B41M 5/265 |
| | | | 430/22 |
| 2004/0156539 A1* | 8/2004 | Jansson | G01N 21/8903 |
| | | | 382/145 |
| 2004/0160599 A1* | 8/2004 | Hamamatsu | G01N 21/8806 |
| | | | 356/237.2 |
| 2004/0207836 A1* | 10/2004 | Chhibber | G01N 21/4738 |
| | | | 356/237.4 |
| 2006/0038980 A1* | 2/2006 | Naka | G01N 21/65 |
| | | | 356/73 |
| 2006/0078190 A1* | 4/2006 | Shibata | G06T 7/0004 |
| | | | 382/149 |
| 2008/0291454 A1* | 11/2008 | Cai | G01N 21/9501 |
| 2012/0092657 A1* | 4/2012 | Shibata | G01N 21/95607 |
| | | | 356/237.4 |
| 2012/0327503 A1* | 12/2012 | Manassen | G01J 1/4257 |
| | | | 359/291 |
| 2014/0071580 A1* | 3/2014 | Higginson | B81C 99/002 |
| | | | 361/234 |
| 2014/0146297 A1* | 5/2014 | Vainer | G01N 21/94 |
| | | | 355/30 |
| 2014/0160471 A1* | 6/2014 | Ueno | G01N 21/956 |
| | | | 356/237.5 |
| 2015/0021466 A1* | 1/2015 | Bibl | G01D 5/347 |
| | | | 250/231.1 |
| 2018/0038803 A1* | 2/2018 | Cui | G01N 21/9501 |
| 2018/0217065 A1* | 8/2018 | Haller | G01N 21/65 |
| 2018/0229497 A1* | 8/2018 | Darrow | B41J 2/2135 |

* cited by examiner

OPTICAL VERIFICATION SYSTEM AND METHODS OF VERIFYING MICRO DEVICE TRANSFER

RELATED APPLICATIONS

This application claims the benefit of priority from U.S. Provisional Application No. 62/393,441, filed on Sep. 12, 2016, which is herein incorporated by reference.

BACKGROUND

Field

Embodiments relate to the transfer of micro devices. More particularly, embodiments relate to systems and methods for monitoring micro device transfer between a donor substrate and a receiving substrate

Background Information

Integration and packaging issues are one of the main obstacles for the commercialization of micro devices such as radio frequency (RF) microelectromechanical systems (MEMS) microswitches, light-emitting diodes (LEDs), and MEMS or quartz-based oscillators.

Traditional technologies for transferring of devices such as "direct printing" and "transfer printing" include transfer by wafer bonding from a transfer wafer to a receiving wafer. In both traditional and variations of the direct printing and transfer printing technologies, the transfer wafer is de-bonded from a device after bonding the device to the receiving wafer. In addition, the entire transfer wafer with the array of devices is involved in the transfer process.

In one process variation described in U.S. Pat. No. 8,333,860 a transfer tool including an array of electrostatic transfer heads is used to pick up and transfer an array of micro devices from a carrier (donor) substrate to a receiving substrate. As described the transfer heads operate in accordance with principles of electrostatic grippers, using the attraction of opposite charges to pick up the micro devices.

SUMMARY

Mass transfer systems and optical verification methods and are described in which optical imaging and inspection techniques may be performed in-situ during a micro device transfer sequence. In an embodiment, a method of optical verification includes picking up an array of micro devices from a donor substrate with a micro pick up array (MPA), moving the MPA toward a receiving substrate, illuminating a surface of the MPA holding the array of micro devices with a wavelength of light while moving the MPA toward the receiving substrate, comparing an acquired image of the surface of the MPA holding the array of micro devices to a reference data, and determining a presence or absence, or global offset, of the micro devices in the array of micro devices. Various operations of the optical verification method may be performed utilizing a micro device detection algorithm. In an embodiment, comparing the acquired image of the surface of the MPA holding the array of micro devices to a reference data includes feature matching to determine the presence or absence, or global offset, of the micro devices in the array of micro devices. In an embodiment, comparing the acquired image of the surface of the MPA holding the array of micro devices to a reference data includes thresholding to determine the presence or absence of the micro devices in the array of micro devices. In some embodiments, the wavelength of light is selected to create a known contrast ratio between the wavelength of light reflective from an MPA layer and micro device layers on the array of micro devices.

DETAILED DESCRIPTION

Figure 1:
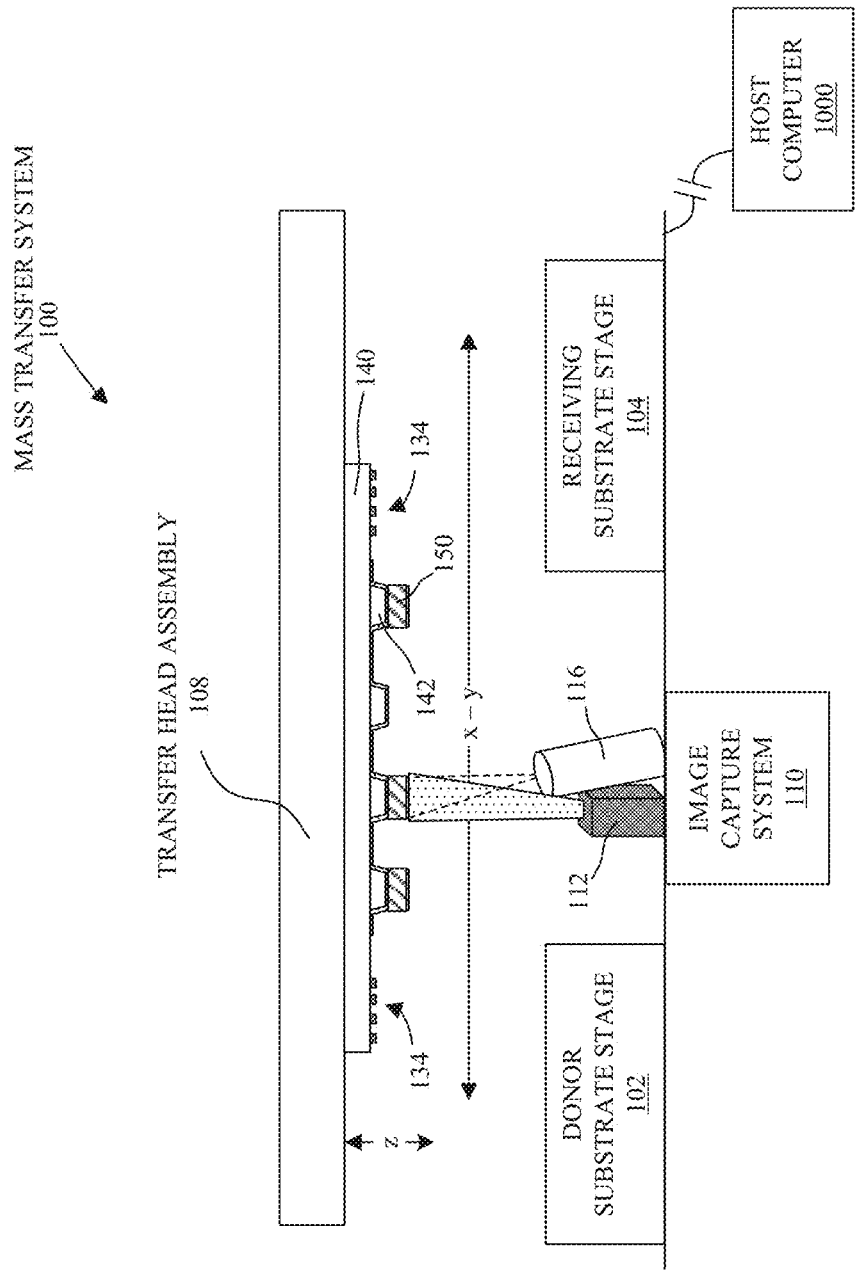
FIG. 1 is a schematic side view illustration of a mass transfer system in accordance with an embodiment.

Embodiments describe systems and methods for verifying that micro devices have been picked from a donor and are poised to be placed to a receiving substrate. The methods may also be used to verify that the micro devices have been placed to a receiving substrate, and that the transfer system is poised for the next pick up operation of additional micro devices. The terms "micro" device, "micro" LED, or "micro" device transfer head as used herein may refer to the descriptive size of certain devices or structures in accordance with embodiments. As used herein, the term "micro" is meant to refer to the scale of 1 to 300 μm. For example, each micro device or transfer head may have a maximum length or width of 1 to 300 μm, 1 to 100 μm, or less. In some embodiments, the micro devices and corresponding transfer heads may each have a maximum length and width of 20 μm, 10 μm, or 5 μm. However, it is to be appreciated that embodiments of the present invention are not necessarily so limited, and that certain aspects of the embodiments may be applicable to larger, and possibly smaller size scales.

Micro device integration in accordance with embodiments may involve moving millions of micro devices per integrated electronic device. To do this cost effectively, micro devices may be moved in quantities of many thousands per transfer and at a high rate (e.g. on the order of 1 second per cycle). Three major categories of errors can occur during micro device transfer: 1) failure to pick a micro device, 2) failure to place a micro device, and 3) positional offset of micro devices relative to their ideal position on a micro pick up array (MPA) that includes the array of electrostatic transfer heads.

Reasons for occurrence of these micro device transfer errors are many and include interference from particles, poor x-y alignment, donor or receiving substrate surface topography, interface pressure variation, and thermal effects, among others. It may be desirable to know in real-time during micro device transfer as these errors occur to detect and correct for problems as they arise and to log errors for future correction. For example, failure to pick a micro device will result in a corresponding missing micro device on the integrated electronic device. If this is known during the transfer, the transfer process can be adjusted to try to re-pick the micro device, or the error can be logged for later correction.

Additionally, it may be beneficial to detect failure to place a micro device prior to attempting the next pick as the presence of the remaining micro device on the MPA will result in subsequent pick failures. If a placement failure is detected, for example, if a micro device remains on the MPA after a first placement attempt, the place operation can be attempted again or a maintenance (e.g. cleaning) operation can be performed to eliminate the remaining micro device. Additionally, an interface pressure with the MPA and a cleaning station can be adjusted based upon the number of micro devices that have been observed to remain on the MPA after the placement operation. For example, the interface pressure may be raised or lowered depending on the number of micro devices remaining on the MPA so that the exerted force on each micro device remains substantially the same irrespective of the number of micro devices on the MPA. Further, knowledge of repeated errors or recurring patterns of errors might indicate a global rather than an isolated problem, which may be addressed by adjusting global operating parameters (e.g. interface pressure, temperature, x-y offset, etc.). For example, a determination of a global offset of the array of micro devices on the MPA compared to an ideal location on the MPA may be used to adjust the placement location of the array of micro devices on the receiving substrate based on the measured global offset.

Methods in accordance with embodiments may occur in-situ and mid-process after the step of micro device pick-up but before micro device placement, and vice versa after micro device placement and before micro device pick up. Accordingly, it may not be necessary to halt the transfer operation to allow removal of any of the 1) donor substrate, 2) receiving substrate, or 3) MPA from the transfer head assembly for inspection. As a result, methods in accordance with embodiments may have minimal impact on the transfer workflow and corresponding time required for micro device transfer.

In various embodiments, description is made with reference to figures. However, certain embodiments may be practiced without one or more of these specific details, or in combination with other known methods and configurations. In the following description, numerous specific details are set forth, such as specific configurations, dimensions and processes, etc., in order to provide a thorough understanding of the embodiments. In other instances, well-known processes and manufacturing techniques have not been described in particular detail in order to not unnecessarily obscure the embodiments. Reference throughout this specification to "one embodiment" means that a particular feature, structure, configuration, or characteristic described in connection with the embodiment is included in at least one embodiment. Thus, the appearances of the phrase "in one embodiment" in various places throughout this specification are not necessarily referring to the same embodiment. Furthermore, the particular features, structures, configurations, or characteristics may be combined in any suitable manner in one or more embodiments.

FIG. 1 is a schematic side view illustration of a mass transfer system 100 in which embodiments may be implemented. As illustrated, the mass transfer system 100 may include a transfer head assembly 108, which may releasably retain an MPA 140 for picking up an array of micro devices 150 from a donor substrate held by a donor substrate stage 102, and for transferring and releasing the array of micro devices 150 onto a receiving substrate held by a receiving substrate stage 104. In an embodiment, the MPA includes an array of transfer heads 142, where each transfer head 142 operates in accordance with electrostatic principles to pick up and transfer a corresponding micro device. In an embodiment each (electrostatic) transfer head 142 has a localized contact point characterized by a maximum dimension of 1-300 μm in both the x- and y-dimensions. In an embodiment, each electrostatic transfer head has a maximum dimension of 1 to 100 μm, or less. In some embodiments, each electrostatic transfer head has a maximum length and width of 20 μm, 10 μm, or 5 μm. The transfer head assembly 108 may be fixed to a chassis of a mass transfer tool e.g., at a location along a translation track and be moveable in the x, y, or z directions for translation between stages, as well as for tipping, tilting, and movement of the MPA 140 in a z direction based on feedback signals within the mass transfer system 100.

In an embodiment, an image capture system 110 including an upward facing illumination system 112 and inspection camera 116 is located between the donor substrate stage 102 and the receiving substrate stage 104. In this manner, a micro device 150 retained by the transfer head assembly 108 may be inspected by the inspection camera 116 while the transfer head assembly 108 moves between the donor substrate stage 102 and receiving substrate stage 104 to verify efficacy of the transfer operations. Operation of mass transfer system 100 and transfer head assembly 200 may be controlled at least in part by a host computer 1000. Host computer 1000 may control the operation of transfer head assembly 108 based on feedback signals received from various sensors, strain sensing elements, and image data generated by the image capture system 110.

Figure 2:
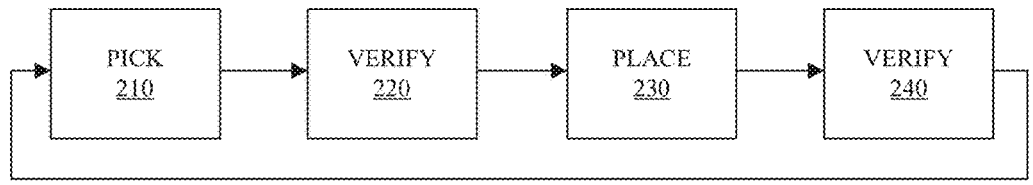
FIGS. 2-3 are flow charts illustrating mass transfer sequences with in-situ verification in accordance with embodiments.

Referring now to FIG. 2 a flow chart is provided illustrating a mass transfer sequence with in-situ verification in accordance with an embodiment. At the start of a micro device transfer operation, a micro pick up array (MPA) 140 picks up micro devices 150 from a donor substrate at operation 210. The MPA 140 is then inspected at operation 220 to verify the micro devices 150 have been picked up. In an embodiment, an image capture system 110 is used to capture a digital image of the MPA 140 after it has picked up micro devices 150 while in motion from the donor substrate to the receiving substrate. A software algorithm (e.g. stored on a non-transitory machine-readable storage medium on a host computer 1000 or elsewhere in the image capture system 110) may be used to analyze the captured image to verify the presence or absence of micro devices 150 on the MPA 140 at each micro electro-static assembly (MESA) location. For example, each MESA location may correspond to a single transfer head 142 (e.g. each transfer head picks up a single micro device), or a group of transfer heads 142 (e.g. a group of transfer heads picks up a single micro device). The software algorithm may also be used to determine any global (x-y) offset of the array of micro devices 150 on the MPA 140 compared to ideal regions of interest on the MESA locations of the MPA 140. In an embodiment, global offset is measured relative to fiducial marks on the MPA 140. For example, the offset may be measured with regard to encoder 134 lines on the MPA 140. The MPA 140 places the micro devices 150 on the receiving substrate at operation 230. In an embodiment, placement of the array of micro devices 150 is based on the determined global offset. Thus, the placement location can be shifted based on the determined global offset to negate a translation error on the pick operation 210, and improve accuracy. The MPA 140 is again inspected at operation 240 to verify the placement of the micro devices on the donor substrate. In an embodiment, the image capture system 110 is again used to capture a digital image of the MPA 140 while in motion from the receiving substrate to the donor substrate. A software algorithm may be used to analyze the image to verify the presence or absence, or global offset, of micro devices 150 on the MPA 140 at each MESA location. The result of this process is a real-time verification of the success or failure of both phases of micro device transfer (pick up and placement) for each micro device. Depending on the results of transfer verification certain corrective actions or adjustments to the transfer process operating parameters may be made.

Figure 3:
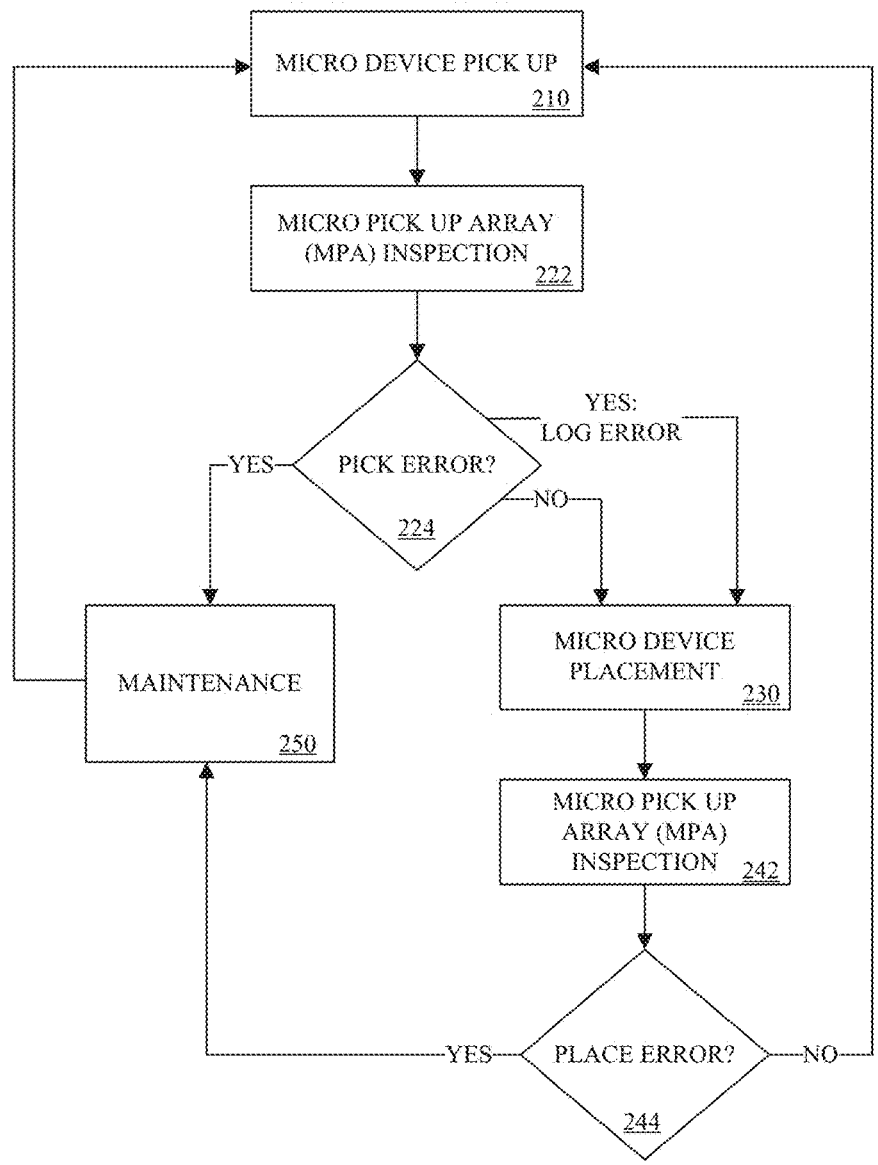

FIG. 3 is flow chart illustrating specific corrective actions and adjustments that may be made to the transfer process in accordance with an embodiment. At operation 210 a translatable transfer head assembly 108 is positioned over donor substrate stage 102 and an array of micro devices 150 is picked up from a donor substrate with an MPA 140 retained by the translatable transfer head assembly 108. The translatable transfer head assembly 108 is then translated along a translation track toward the receiving substrate stage 104. During the translation, the bottom surface of the MPA 140 is inspected at operation 222 by the upward facing inspection camera 116, and a software algorithm (e.g. stored on a non-transitory machine-readable storage medium on a host computer 1000 or elsewhere in the image capture system 110) is used to analyze the captured image to verify the presence or absence, or global offset, of micro devices 150 on the MPA 140 at each micro electro-static assembly (MESA) location. At operation 224, the software algorithm outputs whether a pick error was determined. Together operations 222, 224 may correspond to a verification operation 220 of FIG. 2. A number of different possible corrective actions or adjustments may then be made by a user of the mass transfer system, or automatically determined by the mass transfer system 100 depending upon the output at operation 225. For example, if a threshold amount of micro devices 150 were not picked up or contamination particles are detected, then maintenance may be performed on the MPA 140 at operation 250 to clean the MPA 140. If a pick error is not determined, or if a pick error is detected it may be determined to log the error, and continue with the transfer process, and place the micro devices 150 on the receiving substrate at operation 230. In an embodiment, if a global offset is determined, then the array of micro devices 150 are placed on the receiving substrate by a similar global offset to negate the translation error in the pick up operation 210. The translatable transfer head assembly 200 is then translated along the translation track toward the donor substrate. During the translation, the bottom surface of the micro pick up array (MPA) 140 is inspected by the upward facing inspection camera 116 at inspection operation 242, and a software algorithm is used to analyze the captured image to verify the presence or absence of micro devices 150 on the MPA 140 at each micro electro-static assembly (MESA) location. At operation 244, the software algorithm outputs whether a place error was determined. Together operations 242, 244 may correspond to a verification operation 240 of FIG. 2. If any micro devices 150 remain on the MPA 140 or a threshold amount of contamination is observed, then maintenance may be performed on the MPA 140 at operation 250 to clean the MPA 140. If maintenance is not required, then the transfer head assembly is moved over the donor substrate and the pick and place procedure can be repeated. In an embodiment, cleaning operation 250 may include contacting the micro devices 150 on the MPA 140 with a cleaning station, such as an electrostatic chuck or bonding layer. In instances where a maintenance operation 250 is performed, a software algorithm may also be used to adjust an interface pressure with the micro devices 140 and the cleaning station based upon the number of micro devices that have been observed to remain on the MPA 150. For example, the interface pressure may be raised or lowered depending on the number of micro devices 140 on the MPA 150 so that the exerted force on each micro device remains substantially the same irrespective of the number of micro devices on the MPA.

Figure 4:
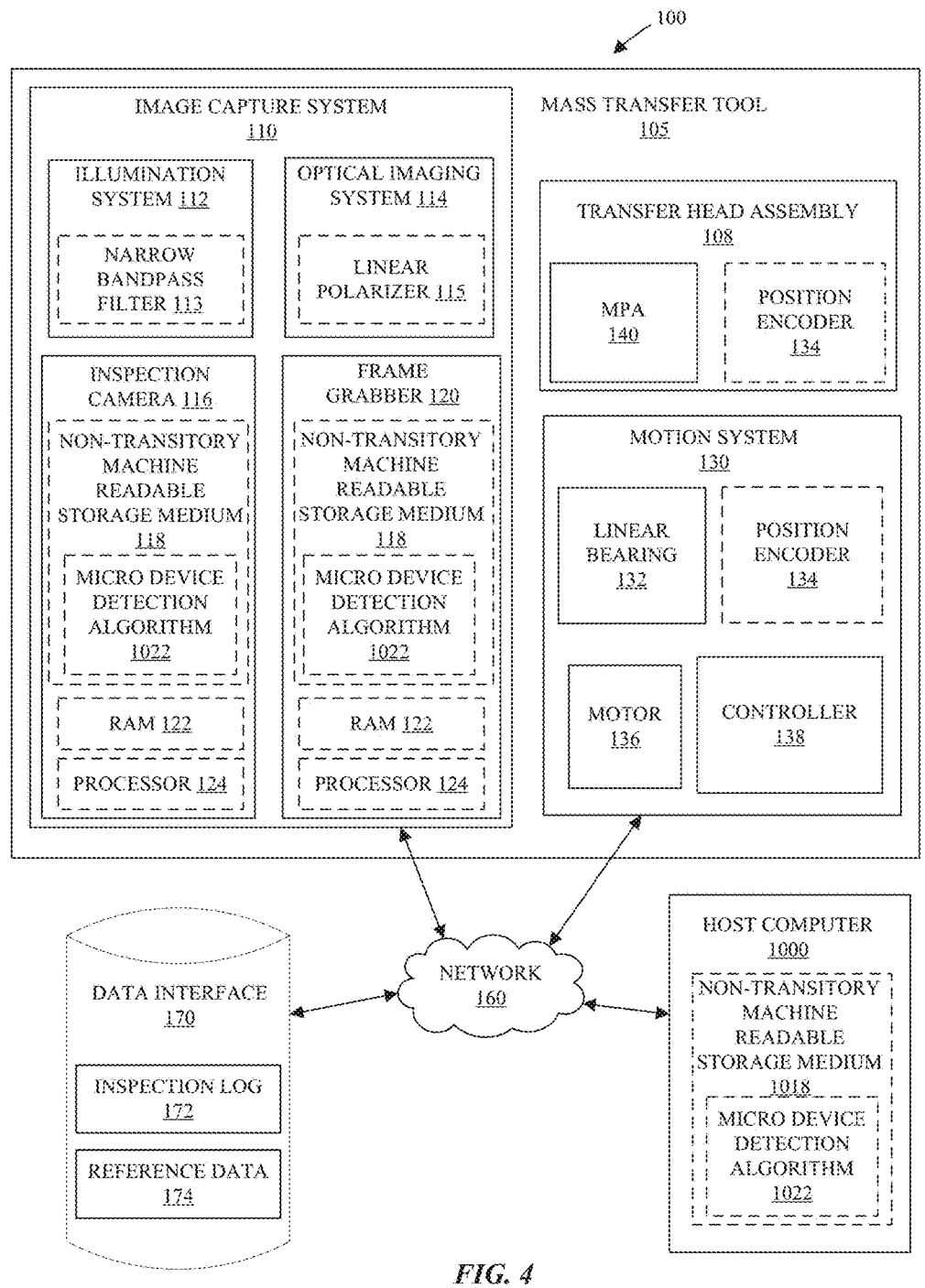
FIG. 4 is a schematic illustration of a mass transfer system in accordance with an embodiment.

FIG. 4 is a schematic illustration of a mass transfer system 100 in which embodiments may be implemented. As illustrated, the mass transfer system 100 includes the transfer head assembly 108, a motion system 130, and image capture system 110. Subsystems of the mass transfer tool 105 may be in communication with a host computer 1000 and data interface 170 over a network 160. The network 160 may be a local area network (LAN), a wireless network, a mobile communications network, a wide area network (WAN), and can include any number of networking and computing devices, including wired and wireless devices. Data interface 170 may optionally be located on the host computer 1000 or the mass transfer tool 105.

The optical imaging system 114 may include an arrangement of lenses and other elements to relay optical energy reflected from the MPA 140 to the inspection camera 116. In an embodiment, the optical imaging system 114 includes a linear polarizer 115. In an embodiment, the optical imaging system 114 is configured for an appropriate balance among field of view, working distance, magnification, spatial resolution, and numerical aperture. For example, the field of view must be sized to image the MPA 140 and micro devices 150 being transferred. This field of view may be in the range of 1 mm to 100 mm, depending on the configuration of the MPA 140. The spatial resolution should be sufficient to image micro devices 150. Hence, the spatial resolution may be in the range of 0.5 micron to 10 micron, depending on the minimum device feature size to be resolved. With typical digital camera pixel sizes in the range from 1 to 10 micron, this may require magnification in the range from 0.5× to 20×. In an embodiment, a camera pixel size is 5 micron and with a spatial resolution is 1.67 micron, and an optical magnification of 3×. The optical imaging system 114 may also include accommodation for illumination, either off-axis or thru-lens.

In an embodiment, the inspection camera 116 is a digital camera that converts optical energy reflected from the MPA 140 into a digital image comprised of an array of pixels. In an embodiment, the digital inspection camera can be a line scan camera. Line scan cameras capture digital images of an object one row of pixels at a time. Such line scan cameras are commercially available from vendors including Basler AG of Germany and e2v Technologies PLC of the United Kingdom. In an embodiment, because each image captured by the camera is of a single row of pixels, many sequential rows of images may be acquired to assemble a single image of the moving object. Because each image includes only of a single row of pixels, the data that is transferred with each image may be much lower than for an area sensor camera. The low ratio of data per frame allows for higher frame rates than typical for an area sensor camera. For example, frame rates for line scan cameras can be in the range of 10 kHz to 1 MHz or even greater.

In a specific embodiment, the frame rate is 400 kHz. Because of such high frame rates, such cameras may be used for capturing images of objects moving at high velocities relative to the camera without blur. For example, an optical imaging system with a spatial resolution of 1.67 micron operating at a 400 kHz line rate may image an object traveling at a relative velocity of 0.667 m/s without gaps or blur in the image. Imaging an MPA 140 traveling at such velocities may reduce the fraction of total transfer time required for micro device transfer verification. Because micro device transfer verification may be performed twice during each transfer cycle, the time required for verification has a direct impact on the total accumulated cycle (TAC) time for micro device transfer. In a specific example, a micro device verification system requires 30 ms to acquire an image of an MPA 140 with length 20 mm in the scan direction traveling at a relative velocity of 0.667 m/s. As each transfer cycle takes as little as 1 second to complete, at least 6% of the TAC time must be dedicated to image acquisition. The example given is intended not necessarily to specify operating parameters but rather to illustrate the impact of performing micro device transfer verification at a high rate.

In an embodiment, the illumination system 112 directs the optical energy to illuminate the MPA 140 and micro devices 150 to be imaged at an intensity level sufficient for detection by the sensor in the inspection camera 116. In an embodiment, the illumination system 112 includes a light source and narrow bandpass filter 113 to select a wavelength range of light. For example, the light source may provide a full range of illumination for the materials system. In an embodiment, the light source is capable of generating light from 400 nm-700 nm. In an embodiment, the narrow bandpass filter 113 only passes a narrower wavelength range, such a peak wavelength +/−10 nm, and the peak wavelength can be centered anywhere from 410 nm-690 nm.

The wavelength used for illumination can be selected to provide a specified contrast ratio between the object to be detected (e.g. micro device) and the background (e.g. MPA). Illumination may be either brightfield or darkfield, depending on the properties and features of the micro devices 150 being transferred. For example, micro devices 150 with specular surfaces might be illuminated with a brightfield illumination while micro devices 150 with scattering surfaces might be illuminated with a darkfield illumination configuration. In one embodiment, illumination light is directed to the MPA 140 through an optical imaging system 114 in a thru-lens, on-axis brightfield illumination aimed normal to the surface of the MPA 140. In another embodiment, the optical imaging system 114 is set at an angle greater than 0 degrees from normal while an illumination system 112 is arranged an equal angle in the opposite direction from normal such that light reflected from the illumination source by the MPA 140 is directed into the optical imaging system 114 in an off-axis darkfield illumination configuration. In an embodiment, a set of illumination optics directs and focuses light to achieve a desired light intensity level. For example, light from a light source may be focused by optics into a line coincident with the field of view of the optical imaging system 114 and aligned to the sensor array within the digital inspection camera 116.

In an embodiment, a digital frame grabber 120 is a printed circuit board (PCB) assembly installed on the image capture system 110 or in a host computer 1000. The PCB assembly may include software (e.g. micro device detection algorithm 1022) stored on a non-transitory machine readable storage medium 118, random access memory (RAM) 122, and a processor 124, such as an application specific integrated circuit (ASIC) or field programmable gate array (FPGA). The frame grabber 120 may be used to command the inspection camera 116 to acquire an image frame and to relay the captured image data from the inspection camera 116 to RAM 122 in the image capture system (e.g. on the frame grabber 120 or the inspection camera 116) or in a host computer 1000. In an embodiment, the frame grabber 120 has an interface that accepts position-based "trigger" signals from a motion system 130, providing spatial and temporal synchronization between the motion system 130 and the image capture system 110. This may be significant because the motion system 130 may not maintain a constant velocity, or the velocity may change during the image acquisition. Because each frame or line of the image is triggered based on actual position of the object being imaged (e.g., and MPA 140) a complete and contiguous image of the object may be reassembled from the set of individual lines without gaps or overlap. As each line is acquired the frame grabber 120 directs the digital image data to RAM 122 either on the frame grabber 120 itself or within the host computer 1000 for subsequent analysis or storage. In an embodiment, the frame grabber 120 is able to move image data at a rate that can keep up with the rate of acquisition (e.g. frame rate capability of a digital inspection camera 116).

Together, the optical imaging system 114, inspection camera 116, illumination system 112, and frame grabber 120, whether located on a host computer or elsewhere, may be referred to as the image capture system 110. In accordance with some embodiments, the image capture system 110 may tune the light wavelength from the illumination system 112 to achieve a contrast enhancement between known layers on the MPA 140 and the micro devices 150 that may boost the statistical probability of micro device detection. For example, the wavelength may be tuned to achieve a large contrast ratio between a layer on each micro device 150 and a background layer on the MPA 140. For example, the tuned wavelength may have the effect of turning the background layer on the MPA 140 into an anti-reflective layer with low reflectivity compared the reflectivity of the layers on micro devices 150.

In an embodiment, a motion system 130 includes a motor 136, linear bearing 132 for x-y motion of the transfer head assembly 108 and MPA 140, optionally an encoder 134, and controller 138 to provide position control of the MPA 140 during pick and place operations and provide motion of the MPA 140 between the donor substrate and receiving substrate. During the move between donor and receiving substrates, the MPA 140 passes the image capture system 110 at a relative velocity. The motion system 130 controller 138 can send a sequence of position-based triggers to the frame grabber 120 to synchronize the image capture with the motion of the MPA 140.

In accordance with embodiments, a micro device detection algorithm 1022 is utilized to analyze captured digital images of the MPA 140 and any micro devices 150 during the transfer process and to identify the present or absence and/or location (e.g. global offset) of micro devices 150 on the MPA 140. The micro device detection algorithm 1022 may employ techniques commonly used in machine vision applications, including reference image subtraction, binning of pixels based on intensity values, analysis in specific regions of interest, pattern recognition techniques, and frequency-based analysis of periodic image features such as Fourier filtering, to list a few examples.

In an embodiment, a micro device detection algorithm 1022 is executed in a host computer 1000. In another embodiment, a micro device detection algorithm 1022 is executed on an FPGA. For example, an FPGA may be a component of the frame grabber 120, allowing for image analysis and detection of micro devices 150 as individual lines or groups of lines are transferred from the (digital) inspection camera 116 or as the image is assembled. In another example, an FPGA is part of a (digital) inspection camera 116, allowing for image analysis and detection of micro devices 150 as individual lines or groups of lines are captured obviating the need and eliminating the time required to offload data from the inspection camera 116 and assemble a full image.

Still referring to FIG. 4, the information compiled by the micro device transfer verification system is stored in a data interface 170 in a format and location useful for the transfer process and for future analysis. For example, information about the presence or absence and/or location (e.g. global offset) of micro devices on an MPA may be stored in an inspection log 172 for immediate in-process use to effect changes to the transfer procedure. In another example, an inspection log 172 about the presence or absence and/or location of micro devices on an MPA 140 may be stored in a database for future analysis. Reference data 174 data (e.g. reference image, reference shape, layer reflectivity %, etc.) may also be stored in the data interface 170.

Together the image capture system 110, optionally data interface 170, and optionally host computer 1000 may be referred to as an optical verification system, which may be a subsystem of the mass transfer system 100.

The above described embodiments of a mass transfer system 100 are intended to illustrative of embodiments and should not be considered limited to the technologies identified. For example, as described the image capture system 110, may include an inspection camera 116 to convert optical energy reflected from the MPA into a digital image of an array of pixels, an illumination system 112 to direct optical energy to the MPA. The illumination system 112 may include a light source and relay optics to direct light to the MPA at an appropriate intensity. A portion of this energy is reflected by the MPA and any micro devices held by the MPA, and relayed to the inspection camera 116 via an optical imaging system 114. The image capture system 110 may additionally include a frame grabber 120 to command image acquisition of the inspection camera 116 and manage the flow of information from the digital camera to storage media or directed to the host computer 1000 for analysis. In an embodiment, the frame grabber 120 is a printed circuit board installed on the image capture system 110, or within the host computer 1000. The motion system provides motion of the MPA 140 relative to the image capture system 110, and provides position information to the frame grabber 120 to synchronize frame acquisition with object motion. The micro device detection algorithm 1022 may be a software program that analyzes a digital image of the MPA to detect presence and location of micro devices 150, and the data interface 170 compiles the micro device presence and location information in an inspection log 172 for use in the transfer process, or later analysis. Particular system elements described may be substituted with alternate technologies without altering the underlying method of verifying micro device transfer as an integral part of the micro device transfer process.

Figure 5A:
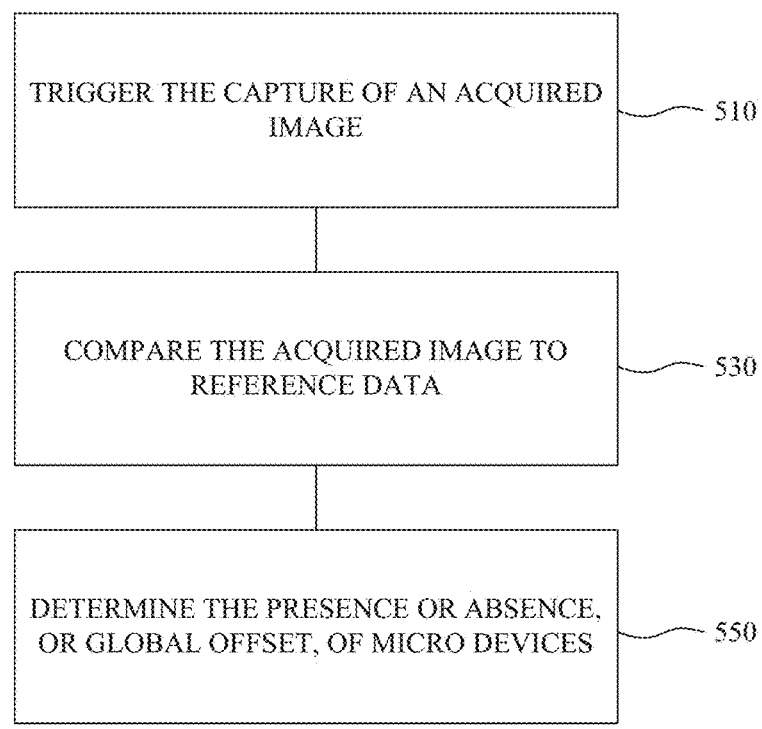
FIG. 5A is a flow chart illustrating a verification sequence in accordance with an embodiment.

Referring now to FIG. 5A, a flow chart is provided illustrating a verification sequence in accordance with an embodiment. For example, this verification sequence may correspond to verification operations 220, 240 of FIG. 2. At operation 510, capture of an acquired image is triggered while the MPA is translated along the translation track toward the either of the receiving substrate or donor substrate. In one embodiment, a frame grabber 120 accepts position-based "trigger" signals from a motion system 130, providing spatial and temporal synchronization between the motion system 130 and image capture system 110. In an embodiment, triggering can be based off of features on the MPA 140. In an embodiment, triggering can be based on an encoder 134, which may be located on the MPA 140, transfer head assembly 108, or an x-y stage (e.g. translation track) to which the transfer head assembly 108 is coupled. In a specific embodiment, encoders 134 are located on laterally opposite sides of the MPA 140 to trigger image capture as the transfer heads 142 are translated into the viewing area of the inspection camera 116. Location of encoders 134 on the MPA 140 may provide additional temporal synchronization accuracy due to the ability to locate the encoders 134 at a location adjacent the transfer heads 142. Once the image capture system 110 has been triggered the acquired image is then compared to reference data at operation 530 with a micro device detection algorithm. At operation 550, the micro device detection algorithm is utilized to determine the presence or absence, or global offset, of micro devices 150, and optionally particle contamination. The output of the micro device detection algorithm is a set of information regarding the presence or absence and/or position of micro devices on the MPA.

In an embodiment, a method of optical verification includes picking up an array of micro devices 150 from a donor substrate with an MPA 140 and moving the MPA 140 toward a receiving substrate. A surface of the MPA 140 holding the array of micro devices 150 is illuminated with a wavelength of light while moving the MPA 140 toward the receiving substrate. A micro device detection algorithm may be utilized to compare an acquired image of the surface of the MPA 140 holding the array of micro devices 150 is to a reference data, and determine a presence or absence of the micro devices in the array of micro devices, or determine a global offset of the array of micro devices on the MPA 140. In accordance with embodiments, the determination of the presence or absence, or global offset, is made in-situ while moving the MPA toward a receiving substrate and before reaching a position over the receiving substrate, or vice versa. In an embodiment, the array of micro devices is placed on a receiving substrate at a location that is shifted based on the determined global offset.

In an embodiment, illuminating the surface of the MPA 140 holding the array of micro device 150 includes directing a light source through a narrow bandpass filter 113 in the illumination system 112. For example, the narrow bandpass filter may pass only specific wavelength range, such as about 20 nm or less in one embodiment. In an embodiment, the wavelength of light is directed from the surface of the MPA holding the array of micro devices 150 through a linear polarizer 115 in the optical imaging system 114.

In an embodiment, the acquired image is one or more sequential rows of images as a single image. In an embodiment, the acquired image is divided into an array of regions of interest (ROI), and comparing the acquired image to the reference data includes comparing the ROI to the reference data.

In accordance with embodiments, each micro device 150 may include a micro device layer and the MPA includes an MPA layer. In some embodiments, the wavelength of light is selected to create a known contrast ratio between the wavelength of light reflective from the MPA layer and the micro device layers.

Figure 5B:
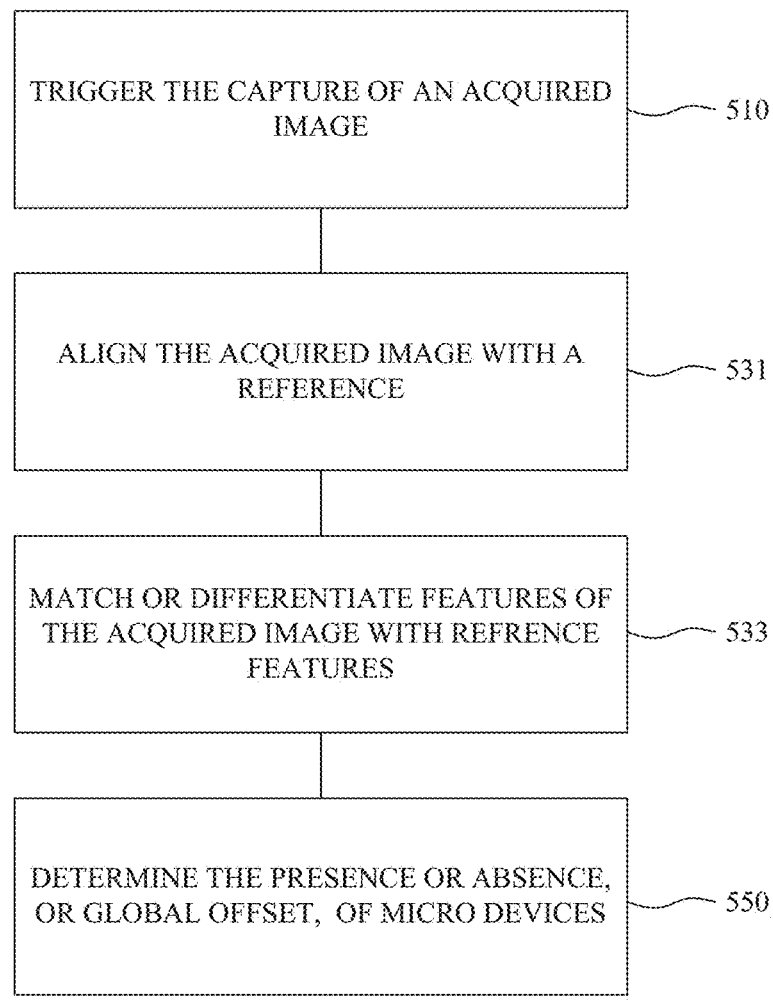
FIG. 5B is a flow chart illustrating a verification sequence including feature matching in accordance with an embodiment.

FIG. 5B is a flow chart illustrating a verification sequence including feature matching in accordance with an embodiment. FIG. 5B is similar to the sequence illustrated in FIG. 5A, with the operation 530 including operations 531 and 533. In the embodiment illustrated in FIG. 5B, the acquired image is aligned with a reference, such as a reference image or reference shape. The reference may additionally be an ideal region of interest (ROI), such as a single MESA or a specific number of MESAs in an array. Alignment of the acquired image with the reference may be performed with an image alignment algorithm, which may additionally match fiducial alignment features of the acquired image with the reference. For example, the MPA 140 may include fiducial alignment features, such as the encoders 134, that are identifiable by a pattern recognition algorithm. In an embodiment, encoders 134 including encoder lines are located at both ends of each row of MESAs. These encoders 134 may be used to calculate the position of each MESA within a corresponding row, and to compensate for optical distortion. During a micro device transfer operation images of the MPA 140 are acquired. Each acquired image can be aligned to the reference by matching the location of the fiducial alignment features. In accordance with embodiments, the image alignment algorithm and the pattern recognition algorithm may be part of the micro device detection algorithm.

In accordance with embodiments, the acquired images and references depend upon the location and direction of the MPA during the transfer sequence. For example, the reference used at verification operation 220 may be an MPA 140 image completely populated with micro devices 150 and no contamination particles, while the reference used at verification operation 240 may be a bare MPA 140 image with no micro devices 150 and no contamination particles. At operation 533 a reference subtraction algorithm is utilized to match or differentiate features of the acquired image with the reference features. The information that remains may include only differences between the acquired image and reference. At operation 550, a micro device detection algorithm is utilized to determine the presence or absence, or global offset, of micro devices 150, and optionally particle contamination. In accordance with embodiments, the reference subtraction algorithm may be part of the micro device detection algorithm.

In another embodiment, a micro device detection algorithm subdivides an acquired image into an array of regions of interest (ROI). The locations of each region of interest within the image may be set based on the expected position of micro devices 150 on an MPA 140 positionally relative to a set of fiducial alignment features on the MPA 140. A micro device detection algorithm may only analyze the image information within each ROI. In an embodiment, a micro device detection algorithm may compare the image information within each ROI against a representative image or shape representing an "ideal" ROI.

Figure 5C:
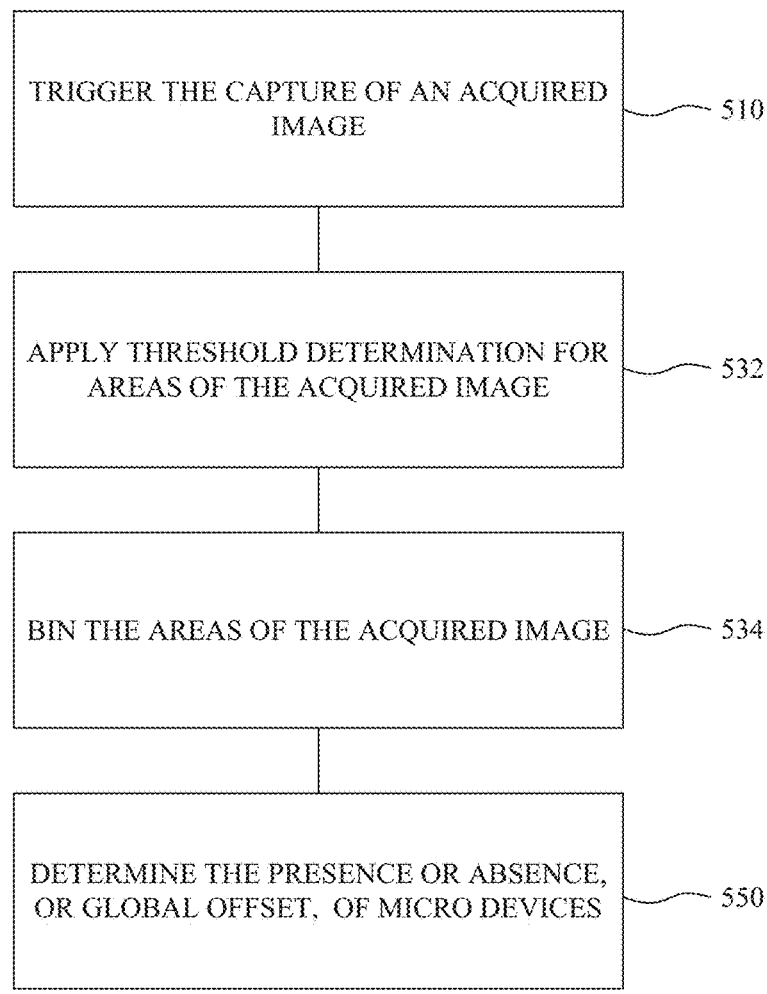
FIG. 5C is a flow chart illustrating a verification sequence including area thresholding in accordance with an embodiment.

FIG. 5C is a flow chart illustrating a verification sequence including area thresholding in accordance with an embodiment. FIG. 5C is similar to the sequence illustrated in FIG. 5A, with the operation 530 including operations 532 and 534. In the embodiment illustrated in FIG. 5C, a micro device detection algorithm is applied for areas of the acquired image to determine whether the areas meet a threshold value (e.g. reference data 174). For example, a micro device detection algorithm might check that an intensity level within an ROI exceeds a particular intensity or grayscale level or that the contrast ratio between the ROI and background meets a particular criteria. At operation 534 the micro device detection algorithm may match or bin the locations depending on whether the areas met the threshold value (e.g. reference data 174). At operation 550, the micro device detection algorithm is utilized to determine the presence or absence of micro devices 150, or global offset, and optionally particle contamination.

Each of the operations 510-550 in FIGS. 5A-5C may be performed by software algorithms (e.g. stored on a non-transitory machine-readable storage medium on a host computer 1000 and/or elsewhere in the image capture system 110). In some embodiments, the micro device detection algorithm 1022 may be stored wholly on the host computer 1000 or wholly on the image capture system 110, or partially on both, or separate locations of the image capture system 110.

Figure 6:
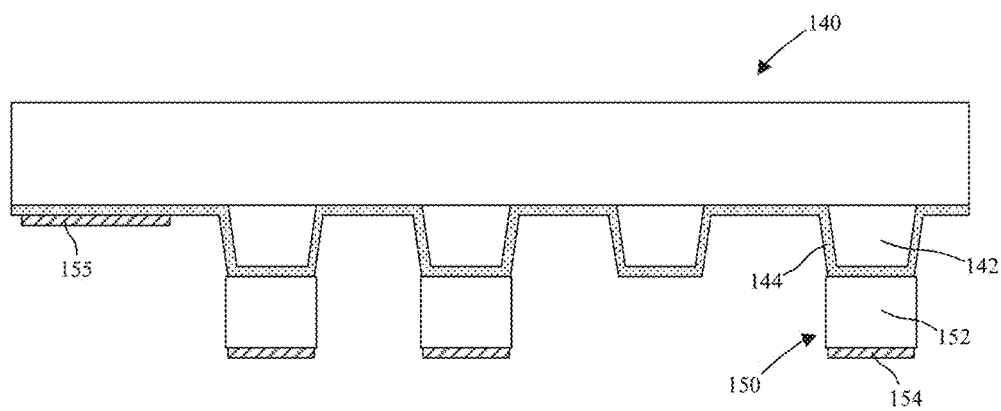
FIG. 6 is a schematic cross-sectional side view illustration of a micro pick up array holding a plurality of micro LEDs in accordance with an embodiment.

Referring now to FIG. 6, a schematic cross-sectional side view illustration is provided of an MPA 140 after picking up a plurality of micro devices 150 from a donor substrate in accordance with an embodiment. As shown, the MPA includes an array of transfer heads 142, which may be operated according to electrostatic principles, as electrostatic transfer heads, and a layer 144 covering the array of transfer heads 142. For example, layer 144 may be a dielectric layer such as $Al_2O_3$, or $SiO_2$, etc. Each micro device 150 may include a bottom layer 154. The bottom layer 154 may for example, be a bottom electrode, or contact layer for bonding and making electrical contact to the receiving substrate. In an embodiment, the bottom layer 154 is a metal layer, such as gold. In an embodiment, the micro device 150 is a micro LED including a micro p-n diode 152, though embodiments are not limited to micro LEDs and may be used with other micro devices, including micro chips, etc.

In accordance with embodiments, the micro device layer 154 is formed of a differentiating material when compared to the MPA layer 144. In order to optically differentiate between the thin film coated substrate (e.g. MPA) and a micro device embodiments also describe methods for enhancing the optical contrast.

In one embodiment, the MPA layer 144 behaves as an anti-reflective layer. The layer thickness can vary from part to part. In accordance with embodiments, methods are described that can be tuned to the actual layer 144 thickness. A broad spectrum light source is filtered using a narrow bandpass filter 113 in the illumination system 112. The central wavelength of this filter can be shifted while maintaining the same narrow band pass. As the central wavelength shifts the light can be optimized to the specific thin film material and thickness. Likewise, thin film materials and thicknesses can be modified to match a specified central wavelength of the system.

In another embodiment, the MPA layer 144 is used as a wave retarder. The layer 144 thickness can vary from part to part, though can be made to act as a quarter wave plate to a wavelength of light. This (retardance) or phase shift allows the light to be suppressed using a linear polarizer 115, which may be located in the optical imaging system 114. The light that reflects off the micro device 150 would not undergo a phase shift and therefore would pass through the polarizer. This would create a large contrast between the micro device 150 and MPA 140 background.

In accordance with embodiments, the MPA 140 may be a consumable part that is periodically replaced. Each time the MPA 140 is interchanged on the mass transfer system 100 a series of calibrations may be performed. In one embodiment, a video autofocus may be performed with an algorithm to focus on the surface of the MPA 140 or other surface of the transfer head assembly 108. In an embodiment, several passes are made with the MPA over the image capture system 110 with varying z-height. The algorithm may analyze criteria for determining a best focus for the field of view, such as edge sharpness etc. For example, edge sharpness of the MESA structures and/or encoders can be utilized to determine a best focus. In accordance with embodiments, the mass transfer tool 105 is additionally calibrated to select an operational wavelength for the image capture system 110.

Figure 7:
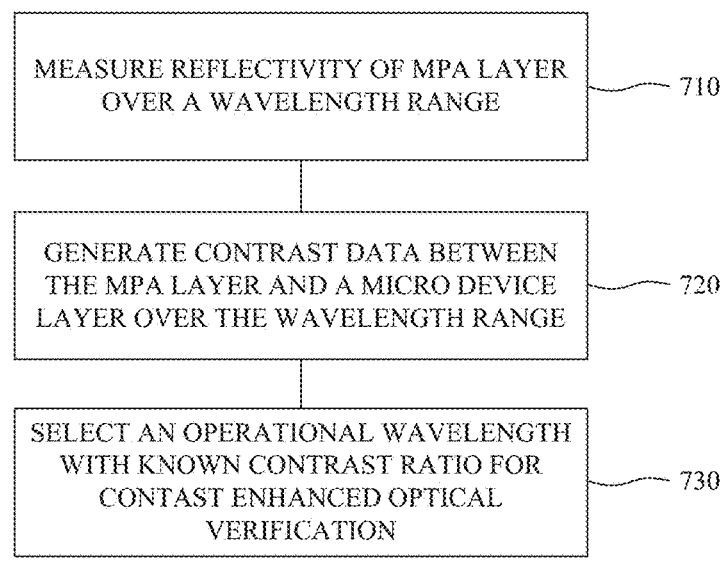
FIG. 7 is a flow chart illustrating a sequence of selecting an operational wavelength for enhanced contrast accordance with an embodiment.

Referring now to FIG. 7, a flow chart is provided illustrating a sequence of selecting an operational wavelength for enhanced contrast accordance with an embodiment. For example, the sequence may be performed each time an MPA 140 is loaded onto the mass transfer tool 105.

At operation, 710 reflectivity of the MPA layer 144 is analyzed over a wavelength range. At operation 720, contrast data is generated between the MPA layer 144 and a micro device layer 154 over the wavelength range. An operational wavelength with known contrast ration (e.g. extinction ratio) may then be selected at operation 730 for contrast enhanced optical verification.

In one embodiment, the micro device layer 154 reflectivity data over the wavelength range is stored as reference data 174. In such an embodiment, the reference data 174 for the micro device layer 154 is used to generate the contrast data at operation 720. In another embodiment, referring briefly to FIG. 6 again, the MPA 140 includes a reference pad 155 formed with similar specifications as the micro device layer 154. For example, the reference pad 155 may be formed of the same material and/or thickness as the micro device layer 154. In such an embodiment, reflectivity of the reference pad 155 may also be measured at operation 710, and used to generate the contrast data at operation 720. In an embodiment, reference pad 155 is one of the encoders 134 illustrated in FIG. 1, and may include multiple lines. Operation 720 may additionally utilize measured reflectivity of the reference pad 155 and reference data 174 at operation 720.

While the above discussion with regard to FIGS. 6-7 has been made with regard to the comparison of reflectivity measurements and data for single layers, it is to be appreciated that embodiments may also be practiced with layer stacks, in which the above single layer analyses are part of multi-layer analyses.

Figure 8A:
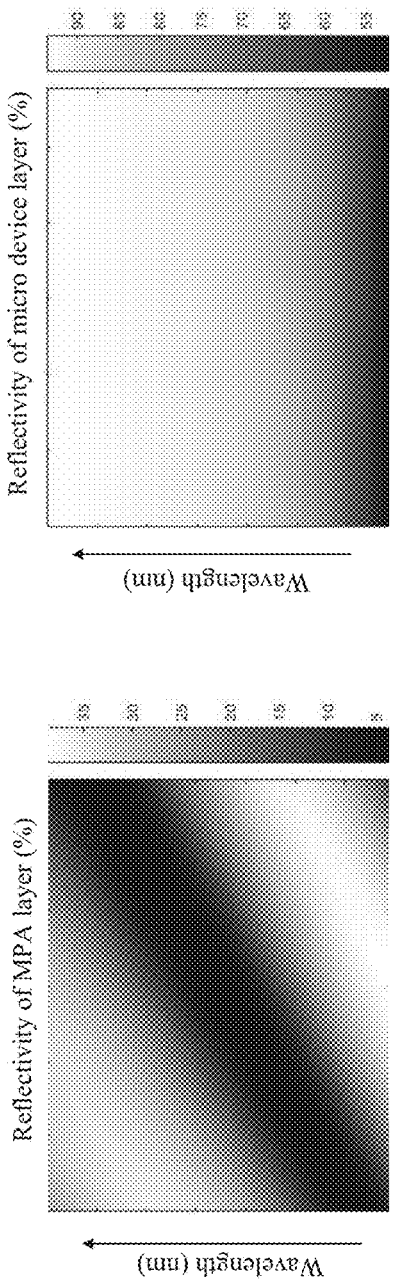
FIG. 8A is an illustration of a reflectivity graph of a transfer head layer in accordance with an embodiment.
Figure 8B:
FIG. 8B is an illustration of a reflectivity graph of a micro device layer in accordance with an embodiment.

In order to provide a visual illustration of a selection sequence, an exemplary reflectivity graph is provided in FIG. 8A of an exemplary dielectric MPA layer 144 at various thicknesses, and an exemplary reflectivity graph is provided in FIG. 8B of an exemplary metal micro device layer 154 at various thicknesses over the same ranges of wavelengths. As shown, the reflectivity of the exemplary metal micro device layer 154 was shown to vary with wavelength but not with thickness for the thicknesses analyzed. In an embodiment, this attribute may facilitate the use of reference pad 155 when generating contrast data at operation 720. This attribute may additionally facilitate the use of reference data 174 for the micro device layer 154 when generating the contrast data at operation 720.

Figure 8C:
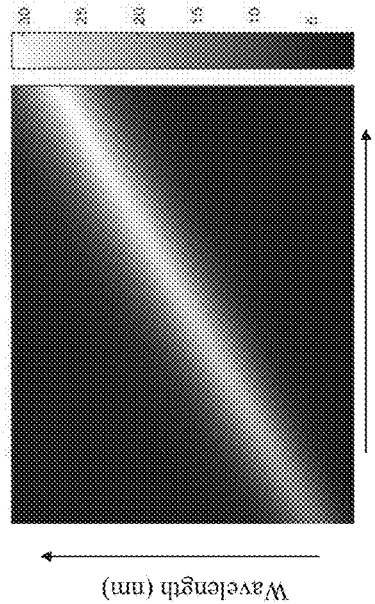
FIG. 8C is an illustration of a contrast graph in accordance with an embodiment.

Referring now to FIG. 8C an illustration is provided of a contrast graph (extinction ratio graph) comparing the reflectivity of the dielectric MPA layer 144 with the metal micro device layer 154 in accordance with an embodiment. This contrast graph shows the thickness for the dielectric MPA layer 144 and the operational wavelength that will create the highest contrast between dielectric MPA layer 144 and the metal micro device layer 154.

While the above examples were provided with regard to dielectric MPA layer 144 and metal micro device layer 154 it is understood that these are one embodiment, and embodiments are not necessarily so limited. A variety of layer compositions may be utilized to achieve contrast enhancement in accordance with embodiments. In addition, while a known contrast ratio (e.g. extinction ratio) can be determined for the operational wavelength itself utilizing the process sequence illustrated in FIG. 7, the actual values may be lower during operation at the micro scale, particularly where micro device dimension approaches the digital camera pixel size and spatial resolution where the image quality and light intensity are reduced. In an embodiment, a theoretical contrast ratio (e.g. extinction ratio) obtained utilizing the process illustrated in FIG. 7 is at least 10:1 (micro device layer:MPA layer). In application, such a theoretical contrast ratio may more realistically correspond to a 2:1 contrast ratio, though this ratio is provided for illustrational purposes only and depends upon a number of variables. In accordance with embodiments, the theoretical contrast ratio and operational wavelength are selected based on statistical data for the number of false positives (e.g. incorrect determination of micro device presence) that can be accepted in the assembly process, which will vary depending upon application.

Figure 9A:
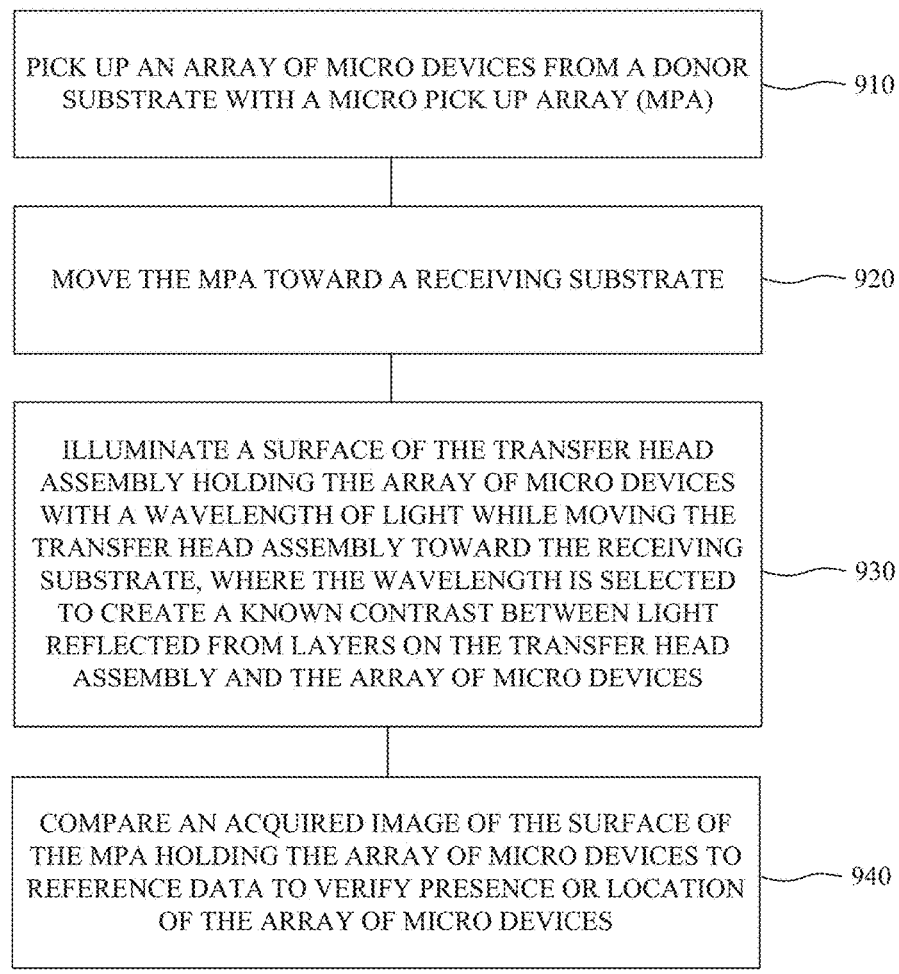
FIG. 9A is a flow chart illustrating a method of verifying micro device pick up in accordance with an embodiment.

FIG. 9A is a flow chart illustrating a method of verifying micro device pick up using contrast enhancement in accordance with an embodiment. At operation 910 an array of micro devices 150 is picked up from a donor substrate with an MPA 140. The MPA is moved toward a receiving substrate at operation 920. At operation 930 a surface of the MPA 140 holding the array of micro devices 150 is illuminated with a wavelength of light while moving the MPA 140 toward the receiving substrate. In some embodiments, the wavelength is selected to create a known contrast ratio between light reflected from a layer 144 on the MPA and a layer 154 on each micro device 150. At operation 940 an acquired image of the surface of the MPA 140 holding the array of micro devices 150 is compared to reference data 174 to verify the presence or location of the array of micro devices 150. For example reference data 174 may be a threshold value (e.g. intensity value). In an embodiment, reference data 174 corresponds to ideal regions of interest on the MESA locations of the MPA 140. Additionally, the wavelength of light may be passed through a narrow band-pass filter 113 that passes a specified wavelength range. In an embodiment, the wavelength of light includes a peak wavelength and a wavelength range of about 20 nm.

Figure 9B:
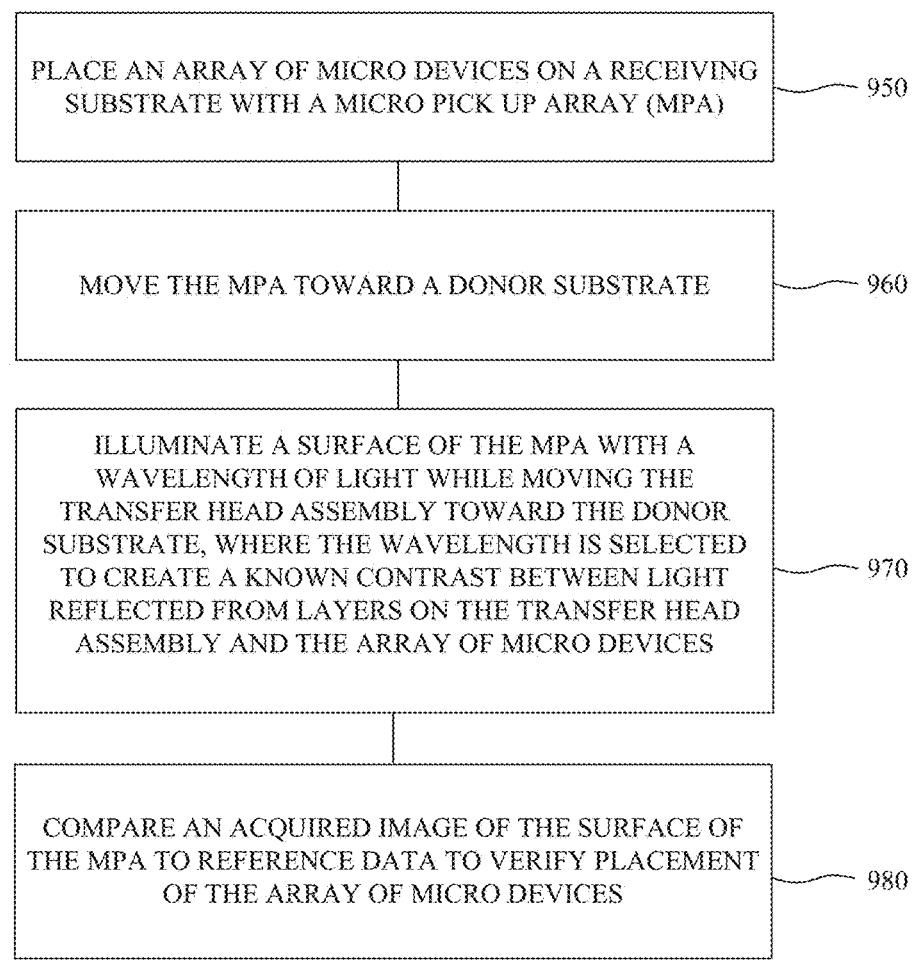
FIG. 9B is a flow chart illustrating a method of verifying micro device placement in accordance with an embodiment.

FIG. 9B is a flow chart illustrating a method of verifying micro device placement using contrast enhancement in accordance with an embodiment. At operation 950 an array of micro devices 150 is placed on a receiving substrate with an MPA 140. The MPA is moved toward a donor substrate at operation 920. At operation 930 a surface of the MPA 140 is illuminated with a wavelength of light while moving the MPA 140 toward the receiving substrate. In some embodiments, the wavelength is selected to create a known contrast ratio between light reflected from a layer 144 on the MPA and a layer 154 on each micro device 150. At operation 940 an acquired image of the surface of the MPA 140 is compared to reference data 174 to verify the placement of the array of micro devices 150. For example reference data 174 may be a threshold value (e.g. intensity value). Additionally, the wavelength of light is passed through a nary bandpass filter 113 that passes a specified wavelength range. In an embodiment, the wavelength of light includes a peak wavelength and a wavelength range of about 20 nm.

Figure 10:
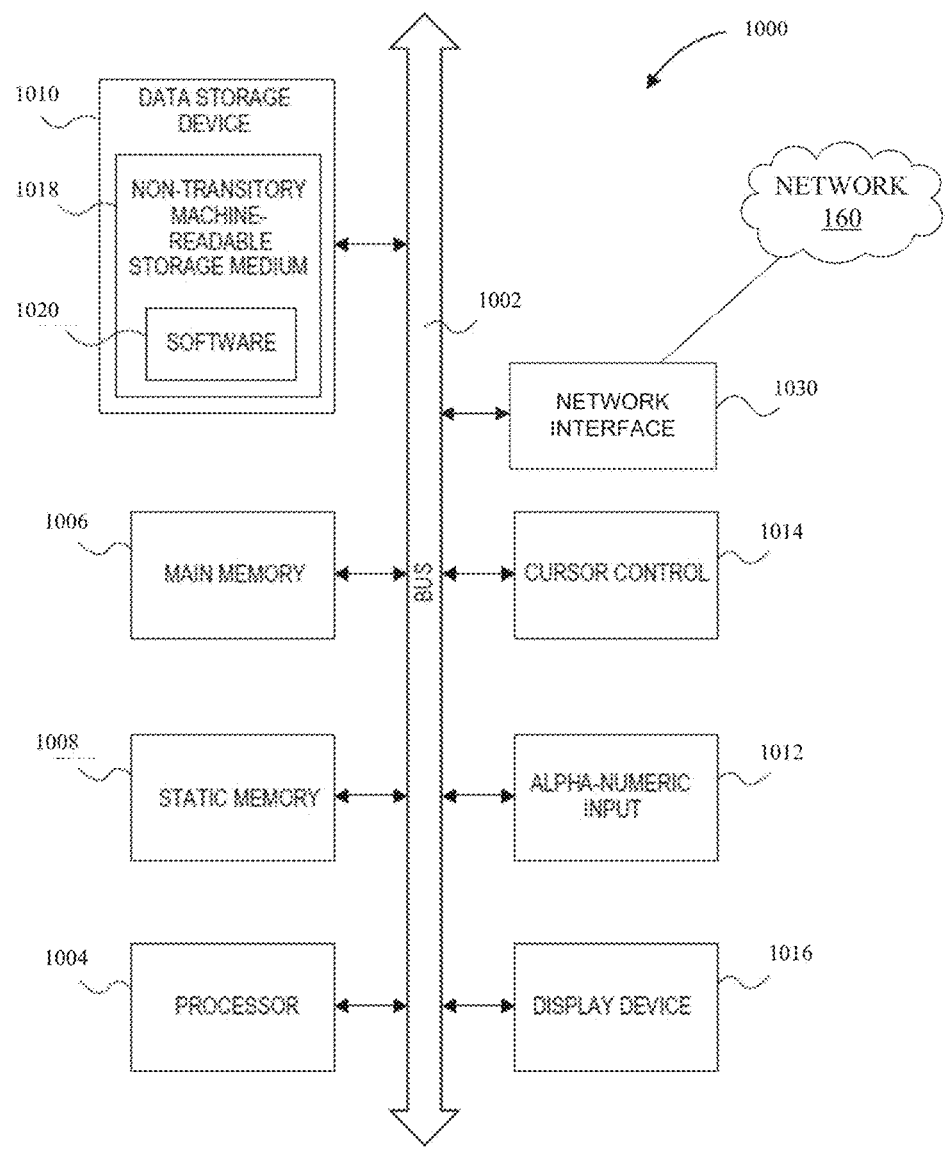
FIG. 10 is a schematic illustration of a host computer system in accordance with an embodiment.

Referring to FIG. 10, a schematic illustration of a computer system is shown that may be used in accordance with an embodiment. Portions of embodiments are comprised of or controlled by non-transitory machine-readable and machine-executable instructions that reside, for example, in machine-usable media of a host computer 1000. Host computer 1000 is exemplary, and embodiments may operate on or within, or be controlled by a number of different computer systems including general purpose networked computer systems, embedded computer systems, routers, switches, server devices, client devices, various intermediate devices/nodes, stand-alone computer systems, and the like.

Host computer 1000 of FIG. 10 includes an address/data bus 1002 for communicating information, and a central processor 1004 coupled to bus 1002 for processing information and instructions. Host computer 1000 also includes data storage features such as a computer usable volatile memory, e.g. random access memory (RAM) 1006, coupled to bus 1002 for storing information and instructions for central processor 1004, computer usable non-volatile memory 1008, e.g. read only memory (ROM), coupled to bus 1002 for storing static information and instructions for the central processor 1004, and a data storage device 1010 (e.g., a magnetic or optical disk and disk drive) coupled to bus 1002 for storing information and instructions. Host computer 1000 of the present embodiment also includes an optional alphanumeric input device 1012 including alphanumeric and function keys coupled to bus 1002 for communicating information and command selections to central processor 1004. Host computer 1000 also optionally includes an optional cursor control 1014 device coupled to bus 1002 for communicating user input information and command selections to central processor 1004. Host computer 1000 of the present embodiment also includes an optional display device 1016 coupled to bus 1002 for displaying information.

The data storage device 1010 may include a non-transitory machine-readable storage medium 1018 on which is stored one or more sets of instructions (e.g. software 1020) embodying any one or more of the methodologies or operations described herein. For example, software 1020 may include instructions, which when executed by processor 1004, cause host computer 1000 to control mass transfer system 100 as described above for performing pick and place, inspection, and cleaning operations. Software 1020 may also reside, completely or at least partially, within the volatile memory, non-volatile memory 1008, and/or within processor 1004 during execution thereof by host computer 1000, volatile memory 1006, non-volatile memory 1008, and processor 1004 also constituting non-transitory machine-readable storage media. The host computer 1000 may additionally include a network interface 1030, for example, for transmitting or receiving the instructions over network 160.

The present disclosure also relates to a system for performing the operations described herein. This system and subsystems may be specially constructed for the required purposes. A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding Detailed Descriptions are presented in terms of algorithms. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "selecting," "analyzing," "generating," "comparing," "verifying," "capturing," "determining," "triggering," "aligning," "subtracting," or the like, refer to the action and processes of a device, or similar electronic computing device, that manipulates and transforms data represented as physical (electronic) quantities within the device's registers and memories into other data similarly represented as physical quantities within the device memories or registers or other such information storage, transmission or display devices.

In utilizing the various aspects of the embodiments, it would become apparent to one skilled in the art that combinations or variations of the above embodiments are possible for verifying micro device transfer. Although the embodiments have been described in language specific to structural features and/or methodological acts, it is to be understood that the appended claims are not necessarily limited to the specific features or acts described. The specific features and acts disclosed are instead to be understood as embodiments of the claims useful for illustration.

What is claimed is:

1. A method of optical verification comprising:
picking up an array of micro devices from a donor substrate with a micro pick up array (MPA);
moving the MPA toward a receiving substrate;
illuminating a surface of the MPA holding the array of micro devices with a wavelength of light and acquiring an image of the surface of the MPA holding the array of micro devices while moving the MPA toward the receiving substrate;

comparing the acquired image of the surface of the MPA holding the array of micro devices to a reference data; and determining a presence or absence of the micro devices in the array of micro devices, or a global offset of the array of micro devices on the MPA.

2. The method of claim 1, further comprising determining the presence or absence, or global offset, while moving the MPA toward a receiving substrate and before reaching a position over the receiving substrate.

3. The method of claim 1, wherein illuminating the surface of the MPA holding the array of micro devices comprises directing a light source through a narrow bandpass filter.

4. The method of claim 3, wherein the bandpass filter passes a wavelength range of about 20 nm or less.

5. The method of claim 1, further comprising directing the wavelength of light reflected from the surface of the MPA holding the array of micro devices through a linear polarizer.

6. The method of claim 1, wherein the acquired image is one or more sequential rows of images as a single image.

7. The method of claim 6, further comprising dividing the acquired image into an array of regions of interest (ROI), and wherein comparing the acquired image to the reference data comprises comparing the ROI to the reference data.

8. The method of claim 1, further comprising placing the array of micro devices on a receiving substrate at a location that is shifted based on a determined global offset.

9. The method of claim 1, wherein each micro device includes a micro device layer and the MPA includes an MPA layer, and the wavelength of light is selected to create a known contrast ratio between the wavelength of light reflective from the MPA layer and the micro device layers.

10. The method of claim 1, wherein comparing the acquired image to reference data comprises:
aligning the acquired image with a reference; and
matching features of the acquired image with reference features.

11. The method of claim 10, wherein the reference is selected from the group consisting of a reference image of the MPA, a region of interest of the MPA, and a predetermined shape.

12. The method of claim 1, wherein comparing the acquired image to reference data comprises:
determining whether areas of the acquired image meet a threshold intensity; and
binning the areas of the acquired image.

13. A mass transfer system comprising:
a motion system that is translatable between a donor substrate stage and a receiving substrate stage;
an image capture system including:
an illumination system that is directed at the motion system to illuminate the motion system;
an inspection camera;
an optical imaging system to relay optical energy reflected from the motion system to the inspection camera; and
a frame grabber;
a memory to store one or more sets of instructions; and
a processor, coupled to the memory, the processor configured to execute instructions to:
pick up an array of micro devices from a donor substrate with a micro pick up array (MPA), each micro device including a micro device layer;
move the MPA toward a receiving substrate, the MPA including an MPA layer;
illuminate a surface of the MPA holding the array of micro devices with a wavelength of light and acquire an image of the surface of the MPA holding the array of micro devices while moving the MPA toward the receiving substrate; and
compare an acquired image of the surface of the MPA holding the array of micro devices to a reference data to verify presence of the array of micro devices.

14. The mass transfer system of claim 13, wherein the illumination system further comprises a narrow bandpass filter that passes a wavelength range of about 20 nm or less.

15. The mass transfer system of claim 13, wherein the optical imaging system further comprises a linear polarizer.

16. The mass transfer system of claim 13, wherein the inspection camera is a line scan camera.

17. The mass transfer system of claim 13, wherein the memory and processor are installed on the image capture system.

18. The mass transfer system of claim 13, wherein the memory and processor are installed on a host computer.

19. A non-transitory computer-readable storage medium comprising executable instructions to cause a processor to perform operations, the instructions comprising:
picking up an array of micro devices from a donor substrate with a micro pick up array (MPA), each micro device including a micro device layer;
moving the MPA toward a receiving substrate, the MPA including an MPA layer;
illuminating a surface of the MPA holding the array of micro devices with a wavelength of light and acquiring an image of the surface of the MPA holding the array of micro devices while moving the MPA toward the receiving substrate; and
comparing an acquired image of the surface of the MPA holding the array of micro devices to a reference data to verify presence of the array of micro devices.

20. The non-transitory computer-readable storage medium of claim 19, wherein the wavelength of light is selected to create a known contrast ratio between the wavelength of light reflected from the MPA layer and the micro device layers.

21. The non-transitory computer-readable storage medium of claim 20, wherein the instructions further comprise:
measuring reflectivity of the MPA layer over a wavelength range;
generating contrast data between the MPA layer and a micro device layer over the wavelength range; and
selecting the wavelength of light with the known contrast ratio.

* * * * *